(12) United States Patent
Birchinger et al.

(10) Patent No.: US 7,533,472 B2
(45) Date of Patent: May 19, 2009

(54) CABLE LENGTH SENSOR

(75) Inventors: Thomas Birchinger, Fürstenzell (DE); Jaroslav Hruby, Bechyne (CZ)

(73) Assignee: Micro-Epsilon Messtechnik GmbH & Co. KG, Ortenburg (DE)

(*) Notice: Subject to any disclaimer, the term of this patent is extended or adjusted under 35 U.S.C. 154(b) by 0 days.

(21) Appl. No.: 12/026,792

(22) Filed: Feb. 6, 2008

(65) Prior Publication Data
US 2008/0141548 A1 Jun. 19, 2008

Related U.S. Application Data

(63) Continuation of application No. PCT/DE2007/000347, filed on Feb. 23, 2007.

(30) Foreign Application Priority Data

Feb. 23, 2006 (DE) .................. 10 2006 008 947
Feb. 7, 2007 (DE) .................. 10 2007 006 813

(51) Int. Cl.
*G01B 3/11* (2006.01)
*B66D 5/32* (2006.01)

(52) U.S. Cl. ............... 33/756; 33/762; 242/379

(58) Field of Classification Search ............ 33/734, 33/735, 754, 755, 756, 761, 762, 763, 769; 242/379, 379.2, 385, 385.4, 563, 563.2, 912
See application file for complete search history.

(56) References Cited

U.S. PATENT DOCUMENTS 443,888 A 12/1890 Adams

| | | | |
|---|---|---|---|
| 5,001,658 A * | 3/1991 | Walters | 702/164 |
| 6,154,975 A * | 12/2000 | Steinich | 33/756 |
| 6,347,462 B1 * | 2/2002 | Steinich | 33/756 |
| 6,381,863 B1 * | 5/2002 | Steinich | 33/756 |
| 6,499,225 B1 * | 12/2002 | Steinich | 33/756 |
| 6,561,451 B1 * | 5/2003 | Steinich | 242/563.2 |
| 6,609,309 B2 * | 8/2003 | Shibuya | 33/733 |

FOREIGN PATENT DOCUMENTS

| DE | 20 2004 007 424 U1 | 7/2004 |
|---|---|---|
| DE | 102006020779 B3 * | 1/2008 |
| EP | 0 778 239 A1 | 6/1997 |
| EP | 1 057 767 A1 | 12/2000 |
| FR | 2879734 A1 * | 6/2006 |

OTHER PUBLICATIONS

The International Search Report for International Appl. No. PCT/DE2007/000347, completed Jun. 22, 2007.

* cited by examiner

*Primary Examiner*—R. A. Smith
(74) *Attorney, Agent, or Firm*—Alston & Bird LLP

(57) ABSTRACT

A cable length sensor, in particular, a bowden cable displacement sensor, comprising a cable drum, a measuring cable wound on the cable drum and a return device at least lightly pre-tensioned in the start position, wherein the measuring cable may be withdrawn by rotating the cable drum against the force of the return device and by withdrawing the measuring cable the return device may be further tensioned. The return device is arranged in a housing, and coupling means for releasably coupling the return device to the rotating movement of the cable drum are provided so as to permit ready removal and replacement of the return device. Also, the housing may be provided with a sensor element operated from outside the housing for determining the current position of the return device, in particular the at least lightly tensioned starting position of the return device.

26 Claims, 1 Drawing Sheet

CABLE LENGTH SENSOR

CROSS-REFERENCE TO RELATED APPLICATIONS

The present application is a Continuation of International Application No. PCT/DE2007/000347, filed Feb. 23, 2007, and which designates the U.S. The disclosure of the referenced application is incorporated herein by reference.

FIELD OF THE INVENTION

The invention relates to a cable length sensor, in particular to a Bowden cable displacement sensor, with a cable drum, a measuring cable wound on the cable drum, and a return device which is pre-tensioned at least slightly in the starting position, where the measuring cable can be drawn off the cable drum, against the force of the return device, by turning said cable drum and where the return device is further tensioned by drawing off the measuring cable.

BACKGROUND OF THE INVENTION

At this point let it be noted that the discussion here is in fact of a cable length sensor and accordingly of a cable drum and a measuring cable but, however, the term "measuring cable" is to be understood in the sense of "means for measurement". When using a measuring cable it can be of any material, e.g. of metal or metal alloys, of single-conductor metal, or of textile of the most varied type of manufacture. Instead of using a measuring cable, using a measuring band is possible, where said band can also be made of textile material, of plastic, or of metal. Finally, it is essential that the medium serving for the measurement is made so as to be stable longitudinally or with respect to drawing. What the means are in a concrete case is not essential for the teaching claimed.

Cable length sensors of the generic type have been known for years in the most varied embodiments. Among the essential components of such a cable length sensor is the measuring cable which is fastened on its end side to the object to be detected in its current position. The measuring cable is wound on the cable drum and is pre-tensioned by the return element. Depending on the application in question, a respective sensor can be provided, which is coupled to the cable drum. Since the diameter of the cable drum is known, the cable length drawn off can be determined via the sensor via an evaluation unit, which is usually external.

In the known cable length sensor the measuring cable is wound onto the cable drum, where the return element is pre-tensioned at least slightly in the completely wound-on state of the cable drum. If the object and the sensor move relative to one another, the measuring cable is drawn from the cable drum. In the reverse direction of motion, therefore when the measuring cable is once again wound onto the cable drum due to the return force of the return element, a motion of the object towards the cable drum or towards the sensor element occurs.

As published state of the art let us name, merely by way of example, EP 0 778 239 B1, which shows a generic cable length sensor. Furthermore, let us refer to U.S. Pat. No. 443,888, which also shows a generic cable length sensor. In both cases the cable drum and the return device are disposed in a housing, where, for replacing the return device, it is necessary to replace the entire cable length sensor and to dismount it—at the factory.

In regard to the state of the art known from practice let it be pointed out that the cable length sensors of the generic type frequently use wire potentiometers or hybrid potentiometers as sensor elements. A significant disadvantage in the case of these sensor elements is their short service lifetime, which in this respect defines the service lifetime of the entire cable length sensor. For this reason, conductive plastic potentiometers or wear-free inductive, magnetic, or optical sensors, among others, have been used in the meantime, since their service lifetime is significantly longer. In such a case the service lifetime of the cable length sensor is not limited by its respective sensor element but rather routinely by the service lifetime of its return device. Typical service lifetimes for commercially available return devices are in the range from 1 to 2 million cycles, where one cycle corresponds to one complete winding off and one complete winding on of the measuring cable. With unfavorable conditions of use, e.g. at high cable speeds and/or accelerations of the measuring cable, the service lifetime of the cable length sensor can be clearly reduced.

If the cable length sensor is used with very frequent motion, an extremely low short service lifetime is to be expected, since, specifically, damage occurs very frequently, even after a few months. This situation is customarily countered either by a damage-related replacement of the sensor or by a preventive replacement of the sensor in the framework of a relatively short service interval. Instead of replacing the entire cable length sensor, it is also conceivable to replace merely the spring elements of the return device, which, however, entails a significant effort.

It is to be noted that a break in a spring in the return device routinely leads to additional damage, e.g. to a tear in the measuring cable. In such a case it is necessary to dismount the complete cable length sensor and to mount a replacement device. Dismounting and mounting on site by unqualified personnel is practically not possible so that a special repair service is necessary. Among the significant disadvantages are, in particular, also long machine downtimes, since specifically the complete cable length sensor must be removed and a new cable length sensor must be installed, where, due to storing a complete cable length sensor in advance, high storage costs arise.

Furthermore, it is necessary in the case of a complete replacement of the cable length sensor to calibrate the control and/or the entire cable length sensor. The defective cable length sensor is customarily sent to the manufacturer, which entails a significant administrative overhead as well as transport costs. Since the conventional repair of the cable length sensor is very labor-intensive, relatively high repair costs arise. Additional costs are to be expected in case of consequential damage to the cable length sensor.

If one wishes to prevent an instance of damage, preventive replacement within a service interval presents itself in the case of conventional cable length sensors. In this case the sensor is to be replaced, more or less regularly, or the cable length sensor in use is to be removed each time. A new cable length sensor, always to be stored in advance, is to be installed by skilled personnel, which in accordance with the discussions above, entails significant storage costs for storing a cable length sensor in advance.

After the installation of the new cable length sensor, the control and/or the complete cable length sensor must be recalibrated. The replaced cable length sensor is sent to the manufacturer, due to which, however, costs arise, namely, on the one hand, costs due to administration and, on the other hand, costs due to transport. The cable length sensor sent to the manufacturer is generally overhauled, which, once again, is labor-intensive.

If one takes into consideration the fact that the return device's springs or spring packs previously indicated as a weak point are replaced separately, then this could theoretically be done on site or at the manufacturer's. In the case of prior-art cable length sensors, thus, for example, according to EP 0 778 239 B1 or U.S. Pat. No. 443,888, the spring replacement alone represents an extremely labor-intensive process. Furthermore, highly qualified technical personnel are necessary, which, in particular, have at their disposal the special tools needed in each case. Moreover, for numerous forms of construction there is a quite significant danger of injury due to a spring possibly jumping out of the housing as soon as the housing is opened and the spring of the return device are withdrawn.

The work to be carried out in replacing the spring of the return device is particularly complex, in particular when the cable length sensor has several springs disposed in series or in parallel. To replace the springs the complete housing, or at least the spring box, must be opened. The springs must be de-tensioned, where a pre-tensioning of typical spring packs can be up to 30 revolutions. If the springs, after the de-tensioning, are replaced, care must be taken that they are connected to one another and/or to the turning axle. If new springs or spring packs are introduced, they must be compressed to generate tension. This is probably the most laborious step of the operation since up to 150 spring revolutions are necessary for this. It is not possible to compress the springs without a special tool. Moreover, there is the danger that in compressing the springs, errors are made in the permissible number of revolutions, which in turn reduces the service lifetime of the spring or the spring pack. Furthermore, it is disadvantageous that the work necessary to replace the individual springs is, as a rule, only possible when the complete cable length sensor has been dismounted from the respective system. This also requires a quite significant investment of time and ultimately causes downtime of the respective machine, system, and so on.

In light of the explanations above, the present invention is based on the objective of developing and extending the cable length sensor of the generic type so that maintenance and repair of the complete cable length sensor is possible with as little effort as possible, even by less qualified personnel.

SUMMARY OF THE INVENTION

The objective above and others are realized by a cable length sensor with the features of the claimed invention. Such a cable length sensor is characterized by the fact that the return device is disposed in a housing, that a coupling means for coupling the return device to the direction of turning of the cable drum is provided, and that a fixing means, which can be actuated from outside of the housing and which serves for fixing the current position of the return device, in particular the at least slightly pre-tensioned starting position of the return device, is associated with, or can be associated with, the housing.

It has been recognized according to the invention that in the generic cable length sensor the return device is a weak point with respect to service lifetime or with respect to maintenance and/or repair. The set of problems related to this can be avoided in an additional manner according to the invention by the fact that the complete return device is disposed in its own housing, where a coupling means for coupling the return device to the direction of turning of the cable drum is provided. Furthermore, a fixing means, which can be actuated from outside of the housing and serve for fixing the current position of the return device, in particular the at least slightly pre-tensioned starting position of the return device, is associated with, or can be associated with, the housing.

The core concept of the present invention accordingly lies in a quite particular modular construction of the cable length sensor, namely to the effect that the complete return device can be replaced in an already pre-tensioned, i.e. usable, condition. For this the return device is designed to have modular form. Accordingly the return device is already compressed in the housing so that dismounting as well as mounting of the complete return device, in functional condition, is possible. Accordingly, the return device is shipped, and in given cases stored, in the pre-tensioned state.

In an advantageous manner the return device comprises at least one return element, where in a still more advantageous manner it is possible to dispose two, three, or more return elements in parallel to one another or in series with one another. In the starting position the return elements are pre-tensioned between the housing and an axle or the coupling means.

In particular in the framework of a particularly simple development, the return elements are implemented as springs, where spiral springs are particularly well-suited due to their approximately rotationally symmetric structure. When using flat spiral springs the idea presents itself of arranging them concentrically about the turnable axle of the return device, where the inner end of the flat spiral spring is connected to the axle and the outer end of the flat spiral spring is connected to the housing or to retaining elements carried by the housing so that a pre-tensioning can be developed in accordance with the arrangement.

As has already been explained previously, the springs work together with the coupling means via an axle, preferably running in the center. The axle can extend, at least slightly, out of the housing, but this is not absolutely required.

Also, it is conceivable that the axle is a type of hollow shaft in which a coupling is housed. Into it a solid shaft with corresponding coupling element could be inserted. When using such a hollow shaft it would not have to project out of the housing.

In particular when using an axle extending at least slightly out of the housing, the coupling means acts between the axle of the return device and an axle of the cable drum in order specifically to connect the two axles to one another in a such manner that they are fixed with respect to turning. In the framework of a quite particularly simple coupling the two axles are aligned to one another.

In concrete terms, it is conceivable that the return elements are disposed in a first housing section and the coupling means in a second housing section, preferably open on the side facing away from the first housing section. The second housing section, open on one side, serves to connect to the housing of the cable drum or flange-mounting on it. Accordingly, the axle of the cable drum should project out of the housing of the cable drum so that the two axles can be connected to one another, at their end sides, within the second housing section and via the coupling means.

The first housing section of the return elements customarily formed as springs comprises, formed in given cases together with the second housing section, a type of spring box, which is implemented as a modular component, and to that extent a replaceable one.

According to the explanations above, the return device can be held by means of the fixing means in the at least slightly pre-tensioned starting position. The fixing means is essentially associated with the second housing section. They act, from outside of the housing, on the axle of the return device and/or on the coupling means so that, on activation of the fixing means, turning of the axle caused by the force of the springs is effectively avoided. With activated fixing means the tension between the housing and the axle can be maintained with interconnection of the springs so that the return device formed with a modular design can be handled independently of the other components of the cable length sensor.

In concrete terms, it is advantageous if the fixing means comprises at least one arresting pin which extends through the housing wall to the axle of the return device or to the coupling means. In so doing, it is conceivable that the arresting pin is provided at least in some areas with an outer thread so that it can be screwed either into the housing wall or into the axle or into the coupling means. A simple plugging in using a certain clamping action is also conceivable.

As has already been mentioned previously, the cable drum is also disposed in a housing, where the return device can be flange-mounted on the housing of the cable drum, preferably via the second housing section.

A fixing means is also associated with, or can be associated with, the housing of the cable drum, said fixing means serving to arrest the cable drum in such a manner that it is fixed with respect to turning. For the purpose of dismounting or mounting, the cable drum can thus be arrested within its housing in order specifically to enable or aid the flange-mounting of the return device. In concrete terms, the fixing means of the cable drum comprises at least one arresting pin extending from outside of the housing through it up to the cable drum, said arresting pin exerting a clamping action on the cable drum. Also, it is conceivable that the arresting pin engages in a corresponding recess on or in the cable drum, where the arresting pin acts in a quite particularly advantageous manner in its arresting position on an end face of the cable drum.

With regard to simple handling of the cable length sensor for the purpose of replacing the return device it is furthermore advantageous if the housing of the cable drum has a greater diameter than the housing of the return device. In the framework of such a development it is possible that the arresting pin of the cable drum projects into it via an end wall of the housing of the cable drum, specifically that end wall that projects above the housing of the return device, so that handling of the arresting pin for blocking the cable drum is possible from outside and in fact even in the case of a flange-mounted return device. Thereby the mounting or dismounting of the return device is aided quite significantly.

In a still more advantageous manner a sensor element for detecting turning of the cable drum is provided, above all when the cable length sensor is a type of Bowden cable displacement system. The sensor element serves for detecting turning of the cable drum, where in the case of known drum diameters the cable length wound on or drawn off can be determined exactly.

The sensor element can be associated with the turning axle of the cable drum or the turning axle of the return device. Thus, in any case a bilateral application of the sensor element is conceivable when the turning axles project outwards on both sides of the respective housing so that a mechanical coupling of the sensor elements is possible.

In a particularly advantageous manner the sensor element is flange-mounted on a side of the cable drum, specifically that side facing away from the return device, preferably on its housing, and along with this is connected, in such a manner that it is fixed with respect to turning, to the turning axle of the cable drum. For this a special housing bracket can be provided which in turn is flange-mounted on the housing of the cable drum. The sensor element connects, as a modular component, directly to this housing bracket so that, in the simplest manner, it can also be removed, as such, from the housing of the cable drum, or from the housing bracket provided there. A connection, fixed with respect to turning, between corresponding coupling means on the sensor element and on the free end of the turning axle of the cable drum can be realized.

Furthermore, let it be noted that the sensor element can be any sensor, preferably a rotary sensor.

BRIEF DESCRIPTION OF THE DRAWINGS

The inventive device will be described in more detail hereinbelow with the aid of an exemplary embodiment of the inventive apparatus, with reference to the accompanying drawings.

DETAILED DESCRIPTION OF PREFERRED EMBODIMENTS

Figure 1:
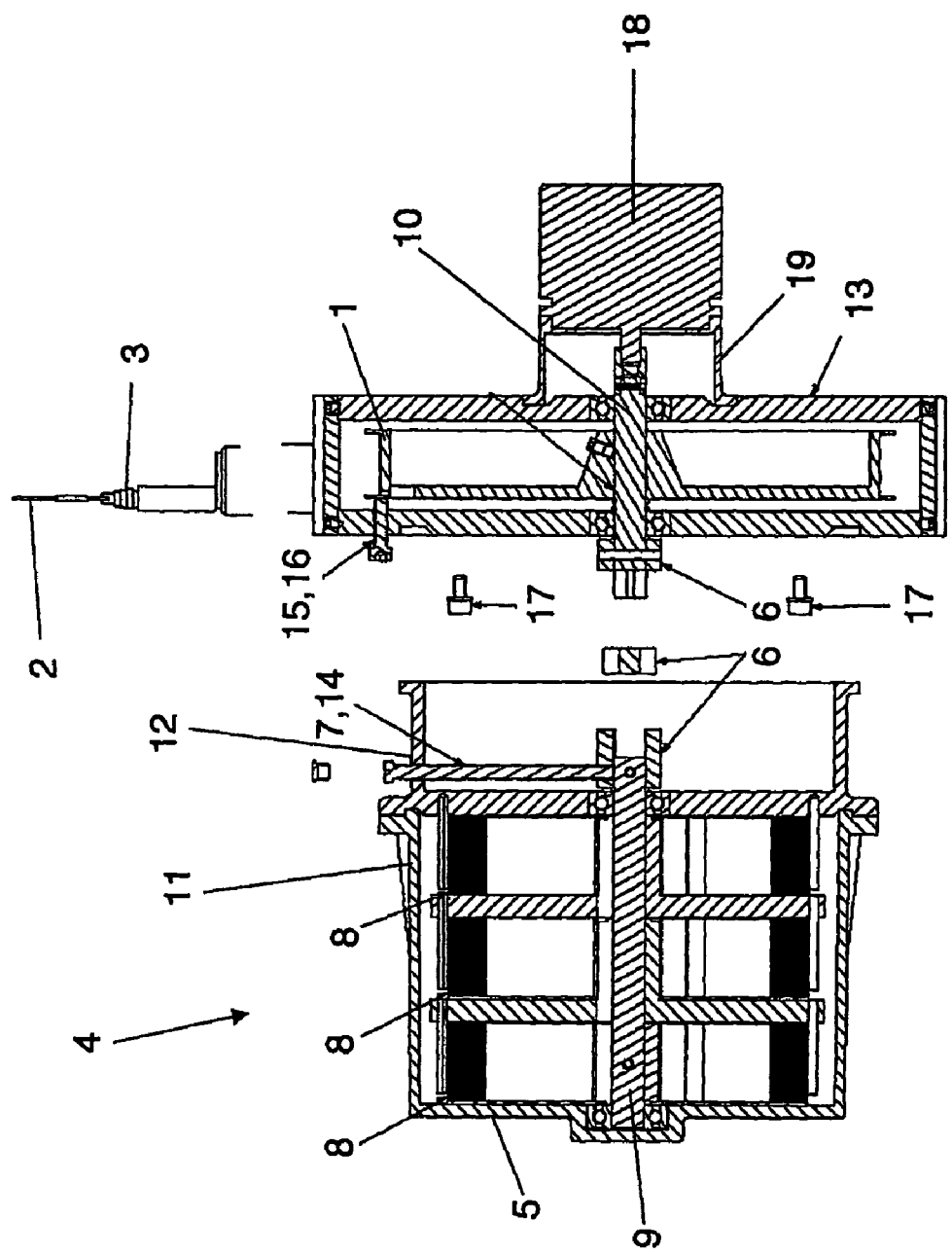
FIG. 1 shows in an exploded schematic view, an embodiment example of a cable length sensor according to the invention.

FIG. 1 shows an exemplary embodiment of a cable length sensor according to the invention with its essential components. The cable length sensor shown here is a concrete example of a Bowden cable displacement sensor. It comprises a cable drum 1 and a measuring cable 2 wound on the cable drum 1, where the measuring cable 2 is only indicated at the measuring cable output 3.

The cable length sensor furthermore comprises a return device 4 which is at least slightly pre-tensioned in the starting position, where the measuring cable 2 can be drawn off the cable drum 1, against the force of the return device 4, by turning said cable drum and where the return device 4 is further tensioned by drawing off the measuring cable 2.

According to the invention the return device 4 is disposed in a housing 5. Furthermore, a coupling means 6 is provided which serves to couple the return device 4 to the turning motion of the cable drum 1. A fixing means 7 serves to fix the current position of the return device 4, in particular the at least slightly pre-tensioned starting position of the return device 4. The fixing means 7 is associated with, or can be associated with, the return device.

The single FIGURE allows one to see that the return device 4 comprises three return elements acting in parallel, where each of the return elements is implemented as a spring 8. Each spring 8 is arrested at its inner end with a turnable axle 9 and at its outer end on the housing 5 or on corresponding retaining pins which in turn are fastened on the housing 5. Consequently, the springs 8 can be tensioned between the housing 5 and the axle 9, where the tensioning and detensioning are done via a turning of the axle 9.

The axle 9 running in the center of the housing 5 extends, at least slightly, out of the housing 5 and works together there with the coupling means 6. In concrete terms, the coupling means 6 acts between the axle 9 of the return device 4 and an axle 10 of the cable drum 1.

The coupling means 6 serves for connecting, in a manner fixed with respect to turning, the aligned axles 9 and 10, where the coupling means 6 can comprise several components.

The single FIGURE furthermore allows one to see that the return elements or springs 8 of the return device 4 are disposed in a first housing section 11 in a nearly enclosed manner. The coupling means 6 is disposed in a second housing section 12 open on the side facing away from the first housing section 11.

Together, the two housing sections 11 and 12 form a type of spring box, where the second housing section 12 serves for flange-mounting on the housing 13 of the cable drum 1.

The fixing means 7 is furthermore associated essentially with the second housing section 12, where the fixing means 7 acts, from outside of the housing 5 or the second housing section 12, on the axle 9 of the return device 4 or on the coupling means 6 provided there. In concrete terms, the fixing means 7 comprises an arresting pin 14 which extends through the housing wall to the axle 9 of the return device 4 or to the coupling means 6 provided there.

As already mentioned previously, the cable drum 1 is disposed in the housing 13. The housing 5 of the return device 4, or the second housing section 12 of the return device 4, can be flange-mounted on the housing 13.

The single FIGURE furthermore allows one to see that on the housing 13 of the cable drum 1 a fixing means 15 is also provided which serve to arrest, in a manner fixed with respect to turning, the cable drum 1. The fixing means 15 comprises an arresting pin 16 extending from outside through the housing 13, said arresting pin, in the simplest case, holding the cable drum 1 in the current turning position by clamping action.

Fastening screws 17 serve to secure the two housings 13 and 5 (comprising the housing sections 11 and 12) together.

On a side of the housing 13 of the cable drum 1, specifically the side lying opposite the return device 4, a sensor element 18 is disposed which serves to detect turning of the cable drum 1. The sensor element 18 is connected via a flange or housing bracket 19 and in such a manner that it cannot turn, to the axle 10 of the cable drum 1, where the sensor element 18 is also designed or implemented in a modular form. Also, the sensor element 18 can be removed from the housing 13 of the cable drum 1, or individual modules of said sensor element can be replaced, in a simple manner.

If, in the cable length sensor according to the invention, it becomes necessary to replace the return device 4 with the springs 8 located therein, the cable length sensor is brought into a position in which the measuring cable 2 is wound completely on the cable drum 1. Thereafter, the cable drum 1 is locked in its position, specifically via the fixing means 15 provided for this, or the arresting pin 16 provided for this. The same applies to the return device 4 or to the springs 8 located therein. Thus, the complete spring pack is locked by means of the fixing means 7 or by means of the arresting pin 14 provided for this. The fastening screws 17 are loosened so that the entire return device with the springs 8 located therein can be removed from the housing 13 of the cable drum 1. A new return device 4, with already pre-tensioned springs 8 located therein, is plugged on, where between the axle 10 of the cable drum 1 and the axle 9 of the return device 4 a connection fixed with respect to turning is produced by the coupling means 6. The fastening screws 17 are tightened. Subsequently, the arresting pins 14 and 16 are loosened so that the cable length sensor with pre-tensioned return device 4 can operate. A replacement of the return device 4 can thus be carried out by anyone in only a few minutes without a special tool. A new calibration of the sensor and control is not necessary.

Finally, let it be noted that the embodiment explained above serves merely for exemplary discussion of the teaching claimed but does not restrict it to the disclosed embodiment.

That which is claimed:

1. A cable length sensor, said sensor comprising:
   a cable drum, a measuring cable wound on the cable drum, and a return device which is pre-tensioned at least slightly in a starting position, the measuring cable configured to be drawn off the cable drum against the force of the return device by turning said cable drum, and the return device further configured to be tensioned by drawing off the measuring cable,
   wherein the return device is disposed in a housing, wherein a coupling means for coupling the return device to the cable drum is provided, and wherein a fixing means, which can be actuated from outside of the housing and which serve for fixing the current position of the return device, is associated with the housing.

2. The cable length sensor according to claim 1, wherein the return device comprises an axle rotatably mounted in the housing, and one or more return elements which can be tensioned individually or together, and in a starting position are pre-tensioned between the housing and one of the axle or the coupling means.

3. The cable length sensor according to claim 2, wherein the return elements are implemented as springs.

4. The cable length sensor according to claim 3, wherein the springs are flat spiral springs.

5. The cable length sensor according to claim 3, wherein the springs work together with the coupling means via the axle.

6. The cable length sensor according to claim 5, wherein the axle extends, at least slightly, out of the housing.

7. The cable length sensor according to claim 5, wherein the coupling means acts between the axle of the return device and an axle of the cable drum.

8. The cable length sensor according to claim 7, wherein the coupling means serves to releasably connect the two axles in such a manner that they are fixed with respect to turning.

9. The cable length sensor according to claim 2, wherein the return elements are disposed in a first housing section and the coupling means is disposed in a second housing section.

10. The cable length sensor according to claim 9, wherein the second housing section is open on a side facing away from the first housing section.

11. The cable length sensor according to claim 9, wherein the first housing section together with the second housing section forms a spring box.

12. The cable length sensor arrangement according to claim 9, wherein the fixing means is associated with the second housing section.

13. The cable length sensor according to claim 12, wherein the fixing means comprises at least one arresting pin which extends through the housing wall to one of the axle of the return device or the coupling means.

14. The cable length sensor according to claim 9, wherein the fixing means acts from outside of the housing on at least one of the axle of the return device or the coupling means.

15. The cable length sensor according to claim 1, wherein the cable drum is disposed in a housing on which the housing of the return device is flange-mounted.

16. The cable length sensor according to claim 15, wherein an additional fixing means is associated with the housing of the cable drum, said additional fixing means serving to arrest the cable drum in such a manner that it is fixed with respect to turning.

17. The cable length sensor according to claim 16, wherein the additional fixing means comprises an arresting pin which extends through the housing of the cable drum.

18. The cable length sensor according to claim 17, wherein the arresting pin engages in a position on an end face of the cable drum when in its position arresting the cable drum.

19. The cable length sensor according to claim 17, wherein the housing of the cable drum projects radially beyond the housing of the return device, and wherein the arresting pin projects into the housing of the cable drum via the end wall of the housing of the cable drum at a location which projects beyond the housing of the return device.

20. The cable length sensor according to claim 15, wherein the housing of the cable drum has a greater diameter than the housing of the return device.

21. The cable length sensor according to claim 1, further comprising a sensor element for detecting turning of the cable drum.

22. The cable length sensor according to claim 21, wherein the sensor element is associated with a turning axle of the cable drum or a turning axle of the return device.

23. The cable length sensor according to claim 21, wherein the sensor element is flange-mounted on a side of the cable drum and is connected in such a manner that it is fixed with respect to turning, to an axle of the cable drum.

24. The cable length sensor according to claim 23, wherein the sensor element is flange-mounted on that side of the housing of the cable drum facing away from the return device.

25. The cable length sensor according to claim 23, wherein the sensor element is flange-mounted on the housing of the cable drum via a housing bracket.

26. The cable length sensor according to claim 25, wherein the sensor element is a rotary sensor.

\* \* \* \* \*